E. A. SPERRY AND E. A. SPERRY, Jr.
SIGHTING DEVICE FOR ORDNANCE.
APPLICATION FILED NOV. 19, 1917.

1,412,758.

Patented Apr. 11, 1922.
5 SHEETS—SHEET 1.

INVENTORS
Elmer A Sperry AND
Elmer A. Sperry. Jr.
BY
Herbert H. Thompson
ATTORNEY E. A. SPERRY AND E. A. SPERRY, Jr.
SIGHTING DEVICE FOR ORDNANCE.
APPLICATION FILED NOV. 19, 1917.

1,412,758.

Patented Apr. 11, 1922.
5 SHEETS—SHEET 3.

INVENTORS
Elmer A Sperry AND
Elmer A. Sperry, Jr.
BY
Herbert H. Thompson
ATTORNEY

E. A. SPERRY AND E. A. SPERRY, Jr.
SIGHTING DEVICE FOR ORDNANCE.
APPLICATION FILED NOV. 19, 1917.

1,412,758.

Patented Apr. 11, 1922.
5 SHEETS—SHEET 4.

UNITED STATES PATENT OFFICE.

ELMER A. SPERRY AND ELMER A. SPERRY, JR., OF BROOKLYN, NEW YORK.

SIGHTING DEVICE FOR ORDNANCE.

1,412,758.  Specification of Letters Patent.  Patented Apr. 11, 1922.

Application filed November 19, 1917. Serial No. 202,706.

*To all whom it may concern:*

Be it known that we, ELMER A. SPERRY and ELMER A. SPERRY, Jr., citizens of the United States of America, residing at 1505 Albermarle Road, Brooklyn, in the county of Kings and State of New York, have invented certain new and useful Improvements in Sighting Devices for Ordnance, of which the following is a specification.

This invention relates to a sighting device or telemeter for use with targets having freedom of movement in more than one plane, the invention having especial application to anti-aircraft ordnance.

The great difficulty in hitting air craft is not so much the inability to obtain a sight upon the craft or even to maintain the cross hairs of the sight upon the target, but lies in the fact that the aeroplane travels so fast that if the gun is aimed directly at it, the aeroplane will have moved out of the path of the shell before the shell reaches it. It will, of course, be readily apparent that the amount of deflection which must be given the shell is dependent upon at least four factors, the range, altitude and velocity of the air craft and the speed of the shell. The fact that the movements of the aeroplane are not confined to one plane, as is the case with ships, but occur in all planes, serves to further complicate the matter.

The object of this inventon is to provide a telemetric device of this character which may be used with accuracy against aeroplanes or other air craft irrespective of their speed of travel or altitude.

A further object of the invention is to improve upon the construction of the telemeters whereby their operation is rendered more accurate, and the mechanism simplified.

Referring to the drawings in which what we now consider to be the preferred forms of our invention are shown:

Fig. 5ª is a detail of the reversing gear in Fig. 1.

Fig. 11ª is a section on line a—a of Fig. 6.

Fig. 11ᵇ is a detail of Fig. 11ª.

Fig. 14ª is a detail thereof.

Figure 12:
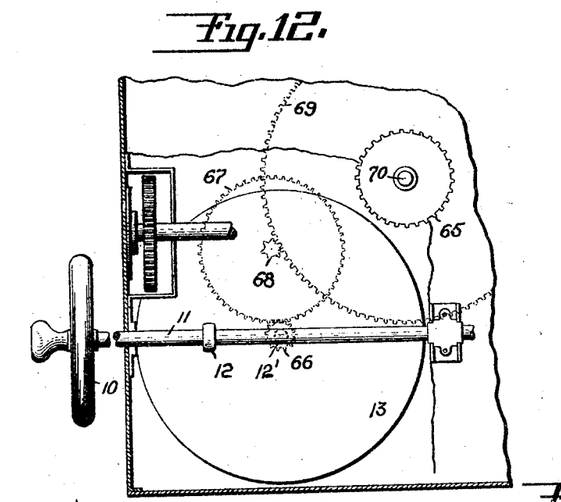
Fig. 12 is a plan view of the interior of the telemeter box, the portion shown being under the part shown in Fig. 1.

The sighting device is shown as a small telescope 1, (see especially Fig. 8) mounted for rotation about a horizontal axis 2 upon a standard 3, rising from the box 4. The eye piece for the telescope is shown at 6. Said box 4, is shown as detachably secured to a tripod 140 and mounted for rotation about a vertical axis 5 so that the telescope is adjustable about both a vertical and a horizontal axis. Adjustment about the horizontal axis is secured by means such as hand wheel 7, which rotates by means of a worm 150 and wormwheel 151, vertical shaft 152. A bevel gear 8 on said shaft serves to rotate a bevel gear sector 9 secured to the telescope so that the telescope is rocked on trunnions 2 in an enlargement 153 adjacent the top of column 3. The entire box may be rotated by means of hand wheel 10 mounted on a shaft 11 which is journaled within the box. Said shaft is shown (Figs. 12 and 13) as carrying a friction roller 12 engaging a disk 13, on the shaft 12' on which is mounted pinion 66. The entire shaft 11 is adjustable longitudinally to vary the position of the roller 12 on disk 13. A large gear 69 (Fig. 13) is clamped to pedestal 5 by nut 155, which may be adjusted by a worm 156 meshing with teeth 157 on said nut. Pinion 66 meshes with gear 67 which in turn carries a pinion 68 meshing with said gear 69 so that on rotation of the pinion the entire box will be revolved about gear 69.

It will be readily apparent that the rotation of the telescope about its vertical axis will follow the movements of the target in a horizontal plane while the movements about its horizontal axis will follow the movements of the target in a vertical plane. I prefer to measure and record independently the movements so resolved. The movements in the vertical plane are shown as transmitted to a sector 20 within the box, the motion of shaft 152 being shown as transmitted to the sector through links 21 and 21'. I prefer to employ multiplying gearing between said sector and the velocity indicator so as to increase the apparent movements about the horizontal axis in order that the velocity may be measured with greater accuracy. For this and other purposes, the sector 20 is meshed with gear 22 loosely mounted on a stud shaft 23 (Fig. 2) and provided preferably on its upper surface with a pin 24. A second gear 25 on said shaft is provided with a downwardly extending pin 26 while a spring 27 is coiled about the pins so as to be placed under tension by relative movement of the two gears in either direction, thereby tending to cause gear 25 to follow the movements of gear 22. Gear 25 is shown as meshing with pinions 28 and 29. The former serves to rotate at a good speed an inertia member or fly wheel 30. Gear 29 on the other hand, meshes with an idler 31 mounted upon the bracket 32 in common with gear 29. The bracket is pivoted at 72 to base plate 160 so that if the gear 25 is rotated in a counter-clockwise direction in Fig. 1, idler 31 will be brought into mesh with a small gear 133 lying directly under a gear 33 (Fig. 5) and if gear 25 is rotated in a clockwise direction, pinion 29 will be brought into mesh with gear 133. By this or other change speed device, gear 133 is always driven in the same direction irrespective of the direction of drive of the gear 25 and sector 20. At the same time, no sudden jerks or changes in velocity are transmitted thereto, since the fly wheel 30 in conjunction with the spring 27 maintains a fairly uniform speed for the said gear train to which sudden increases in velocity of gear 22 cannot be transmitted, the gear 133 being driven at a velocity proportional to the average velocity of sector 20 during a short period of time. Gear 133 is provided with a friction face 132 against which another gear 33 is normally pressed by spring 134, but is disengaged upon a predetermined event as hereinafter described. Gear 33 engages a continuously rotatable member designed to measure speed which may be referred to as a rate of motion indicator. The said indicator is represented as continuously rotated from the clock work 35 which drives the member through a chain 36 and sprocket 37. A handle 35' is shown to rewind the clock. Said member 34 is shown as consisting of a frame 39 supported for rotation in brackets 161 and 162. A plurality of sectional toothed bars $38_1$, $38_2$, $38_3$ (see Fig. 11), are longitudinally slidable in slots 40 in frame work 39. Each bar is normally retracted by a spring 41. The rotation of the gear 33 however during the time the said bar is under the wheel, will advance it an amount proportional to the speed of wheel 33. As the bar advances block 42 secured thereto engages a collar 43 pinned or otherwise secured to a shaft 44, extending loosely through frame 39 and moves said shaft 44 longitudinally. As soon however as the bar rotates from under gear 33 it is engaged by a fixed detent $45^a$ which holds the bar in its advanced position against the action of spring 41 for approximately one third of the revolution, at the end of which time the bar is snapped back to its original position by spring 41.

Figure 6:
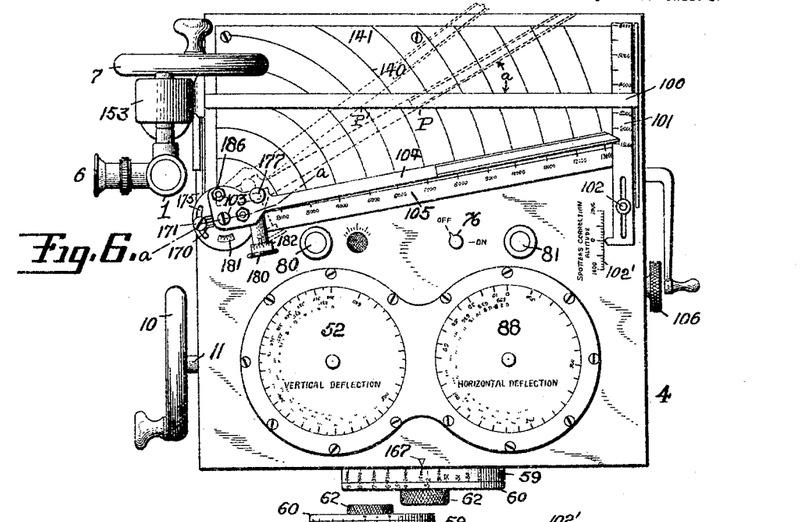
Fig. 6 is a plan view of the top of the telemeter.

It will readily be seen that the position of the bar 44 furnishes a ready indication of the speed of the air craft in a vertical plane. Bar 44 is shown as provided adjacent its lower end with a cross piece 45 having guide slots 46 in which slide pins 47 are fixed on the base plate. A segmental rack bar 48 is pivoted at 49 adjacent said member 45. The rack teeth 50 engage a pinion 51 on the shaft of an indicator disk 52. A slidable pin 53 serves to connect member 45 and arm 48, said pin sliding between the two members and being secured to a rod 54 having lateral movement. Arm 48 is yieldingly held against pin 53 by the action of a coiled spring 166 which acts to rotate pinion 51 counter-clockwise and hence holds arm 48 up. This also holds pin 53 against member 45. Said rod 54 is shown as secured to a slidable rack bar 55, the teeth of which engage a pinion 56 on shaft 57. A setting handle or knob 58 is adjustably secured to shaft 57 for setting it to the range indicated by another portion of the instrument. Preferably the said setting means comprises an inner annular member 59 which is loosely mounted on the shaft 57, Fig. 4, and is graduated in units of range. An intermediate disk 60 is non-rotatably mounted on said shaft as indicated by the squared portion 61 of shaft 57. Disk 60 is preferably provided with time unit divisions such as seconds. The knurled knob 62 threaded on said shaft is used to release and clamp member 59 on the shaft at will, said member being set with reference to an index 167 (Fig. 6.)

Preferably, mechanism corresponding to the mechanism already described in incorporated in the box to compute the horizontal deflection also. When the handle 10 is rotated, the entire box is revolved around a gear 65 fixed to stationary shaft 70, thereby rotating a gear 22' similar in function to gear 22 through an idler 71. Gear 22' is preferably equipped with a lost motion spring device similar to gear 22 by means of which gear 25' mounted immediately above it is turned. Said gear 25' drives both a fly wheel 30' through idler 28'; and a pinion 29' mounted on arm 32' pivoted at 72'. A second pinion 31' mounted on said arm meshes with the first pinion 29' so that either one of said pinions is brought into engagement with gear 33', dependent on the direction of rotation of gear 25' as in the former case.

Means are preferably provided to hold both trains of gears out of mesh with the said measuring devices in case it is desired to adjust the instrument for any reason, in order to avoid the unnecessary load of the speed measuring device on the gears. Said means may consist of a T shaped locking bar 73 having wedge shaped projecting members 74 adjacent its outer ends and adapted to engage notches 75 in the ends of rotatable supports 32 and 32'. A knob 76 on the exterior of the case serves to rotate a link 77 pivoted to a second link 78 by means of which the member 73 is moved into and out of engagement with arms 32 and 32'. It will readily be seen that when the T shaped member is in a downward position that all of the gears 29, 31, 29' and 31' will be held out of mesh with the gears 33 and 33'.

Figures 8, 9, 11:
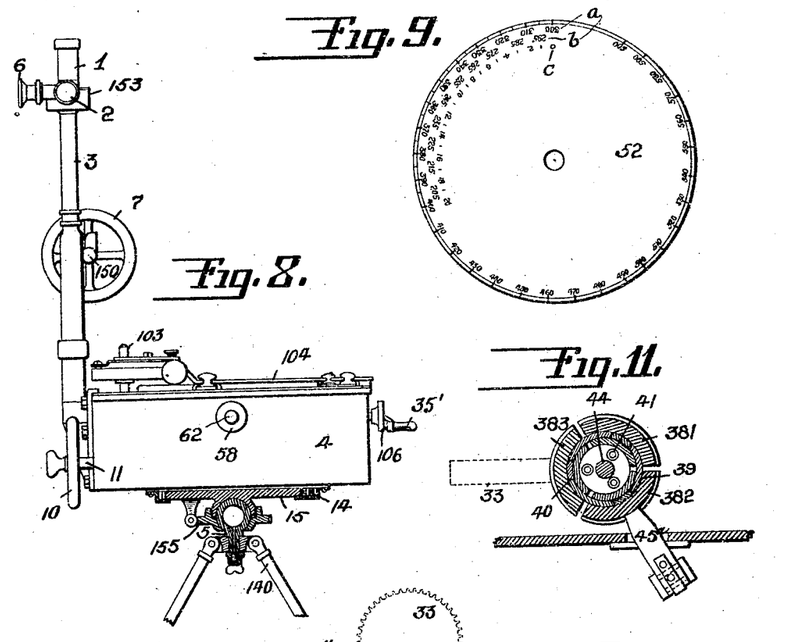
Fig. 8 is an elevation partly in section of a telemeter.
Fig. 9 is an enlarged view of one of the deflection disks.
Fig. 11 is a section on line 11—11 of Fig. 10.
Figures 10, 11A, 11B:
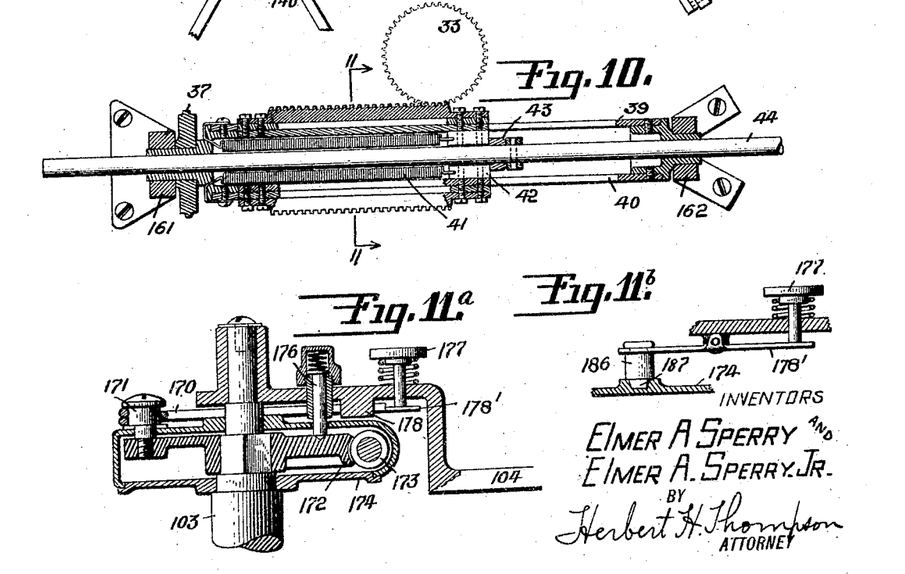
Fig. 10 is a longitudinal section in a horizontal plane of one of the speed indicators, of Fig. 1.

Preferably means are provided to indicate in which direction the gears 25 and 25' are rotated. Said means may consist of apertures or windows 80 and 81 in the casing through which are visible members 82 and 83 secured respectively to gear supports 32 and 32'. Said members 82 and 83 are each provided with colored disks 84 and 85 or the like, one or the other of which is visible through the openings dependent on the direction of rotation of gears 25 or 25'. If said gears are stationary neither disk is visible, or they are only partially visible. The speed measuring device 34' may be similar in all respects to device 34, and is shown provided with shaft 44' and a cross member 45' which acts to move rack bar 48' on pivot 49' after the fashion of members 45 and 48. Rack bar 55 preferably also carries on cross piece 54' a pin 53' which serves as a floating connection between members 45' and 48' so that one setting of the range handle serves to set both the vertical and horizontal deflection indicators. The gear sector 50' meshes with a pinion 51' carrying the horizontal deflection disk 88. Both disks 52 and 88 are provided with a plurality of scales $a$, $b$ and $c$, all of which represent preferably mils (Fig. 9). Scales $a$ and $b$, are laid out to correspond to the graduations on the guns with which the instrument is to be used, but extend in opposite directions, one scale being read when the telescope is turning in one direction while the other is read in the other event. Which scale should be read is indicated at window 80 or 81, as explained above. Since in practice the time of flight of a shell is seldom less than about 2 seconds and the "dead" time less than 3 seconds, it will be seen that the minimum multiplier used is about 5 and at the same time the maximum multiplier is limited by the range. Scales $a$ and $b$ may be laid out, therefore, in large graduations of limited extent. As shown in Fig. 9, on scale $a$ the graduations extend from 300 to 600 mils. To check the instrument, however, a third scale $c$ is provided, one fifth the magnitude of the others and extending from 0 up.

In order to prevent the gear sectors 50 and 50' from running off pinions 51 and 51', we may provide an automatic throw-out device for each sector consisting of a rod 89 having a catch 90 in the path of a lug 91 on the end of bar 50 so that rod 89 is moved downwardly upon engagement with the lug. Said rod is shown as pivoted to an irregularly shaped lever 92. Said lever is pivoted to collar 93 on gear 33 and also pivoted to fixed support 160 at 94 so that upon movement of said bar to the left of Fig. 5, for instance, gear 33 is raised out of engagement with the friction face 132 of gear 133, thereby throwing out the device.

Figures 1, 2, 3, 4, 5:
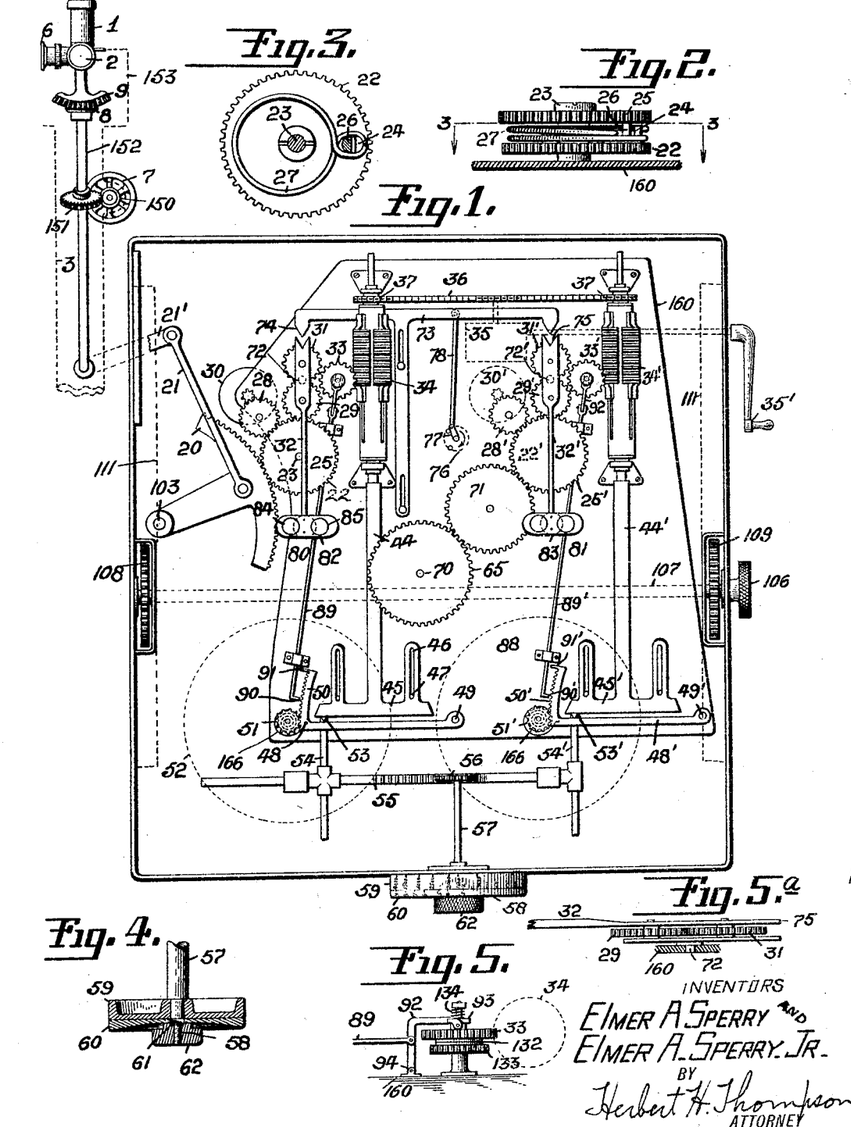
Fig. 1 is a plan view of the interior of the telemeter, parts thereof being indicated diagrammatically.
Fig. 2 is an elevation of a portion of the mechanism shown in Fig. 1.
Fig. 3 is a section on line 3—3 of Fig. 2.
Fig. 4 is a section of the setting handle in Fig. 1.
Fig. 5 is a detailed elevation of a clutch in Fig. 1.
Figure 13:
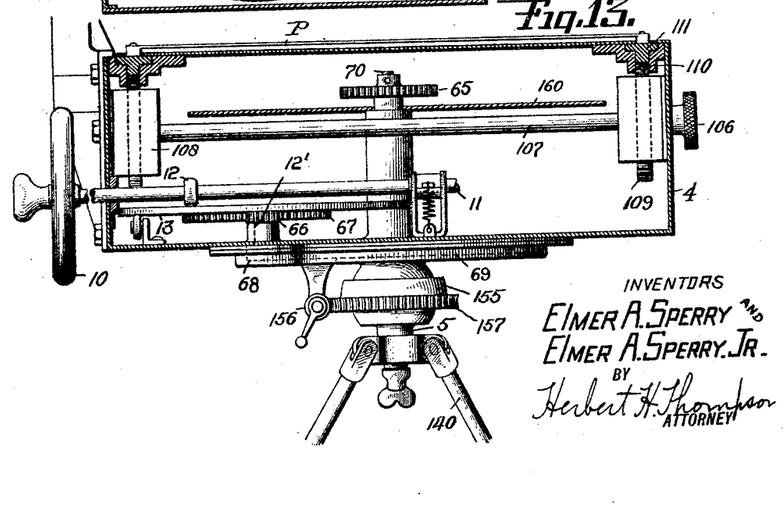
Fig. 13 is a vertical section through the box, the mechanism shown in Fig. 1 being omitted for the sake of clearness.

Upon the face of the instrument or in any suitable other location, is mounted an adjustable bar 100 adapted to be set with reference to altitude scale 101, corresponding to the altitude of the target, the altitude being obtained by means of a goniometer or other instrument, which may or may not be incorporated as a part of this instrument. The adjustment of the bar 100 is obtained by means of a knob 106 on shaft 107 on which are mounted a pair of gears 108, 109, which mesh with rack teeth 110 on the under surface of parallel bars 111, carrying the cross bar 100 (Figs. 1 and 13). The scale 101 is shown as adjustably mounted as by means of clamp nut 102 so that the spotters correction for altitude may be applied by shifting the altitude scale with reference to scale 102'.

Mounted upon the shaft 103 or other part rotatable with the telescope, in a vertical plane, is an arm 104. It will readily be apparent that the angle "$a$" made by the arm 104 with the bar 100 is the angle of elevation of the target, and also that the distance from the point of intersection P between bar 104 and bar 100 from the pivotal point 103 of the former is proportional to the range of the target, the altitude being a component or vector of the range. This distance may be read on scale 105, by following down the graduated arcs 140 on the face plate 141, as will be readily apparent. It is this distance which is taken as a basis for the setting of the range dial 59.

Preferably arcs 140 are not true arcs of circles about point 103, but are laid out having due regard for the variation in the retarding effect of gravity with the angle of elevation of the gun. The scale on ring 59 is laid out to represent the time of flight of the shell for indicated ranges for any particular type of gun. It is of course obvious that the ring and scale may be changed for guns having different muzzle velocities. After setting ring 59, disk 60 is adjusted until a predetermined number thereon comes adjacent the indicated range whereby a fixed or "dead" time which represents the time taken to fire the gun after the signal, etc., is added to the time of flight of the shell. Upon the proper setting of the said time disks it will be readily apparent that both the vertical and horizontal deflection will be indicated by the disks 52 and 88.

The range indicated on scale 105 by point P is not the true range of the target at the time the shell reaches its mark, but is the range at the time of observation. If it is desired to ascertain the first mentioned range for setting the fuses of the projectiles, the arm 104 may be loosely mounted on shaft 103 (Fig. 11ª), being connected thereto through a yielding member or spring 170 so as to normally follow the movements of shaft 103, but be adjustable with respect thereto. As shown, spring 170 extends between a lug 178 on arm 104 and a pin 171 fixed to a worm wheel 172, which is non-rotatably mounted on shaft 103. A worm 173 engaging said wheel 172 is journaled in a casing 174 having a slot 175 for pin 171, so that upon rotation of the worm said casing is revolved. Bar 104 is detachably locked to said casing by a spring pressed detent 186 on said bar which engages a hole or depression in the casing 174. When it is desired to release arm 104, button 177 is depressed rocking lever 178' (Fig. 11ᵇ) and raising pin 186, thus allowing spring 170 to bring arm 104 back to its central or normal position. A spring pressed pin 176 engaging a V shaped notch in wheel 172 and passing through a slot in casing 174 may be used to assist in centralizing the arm. This device is used as follows: As soon as the range and vertical deflection are obtained from arm 104 in its normal position and from dial 52, worm 173 may be turned by graduated knob 180 until arm 104 has been turned through the angle of vertical deflection as indicated by scale 181 on the worm wheel 172 and by micrometer scale 182 on knob 180. The new point P' so located shows on scale 105 the fuse setter's range. By pressing button 177 the arm is returned automatically to its normal position with respect to shaft 103.

Figure 7:
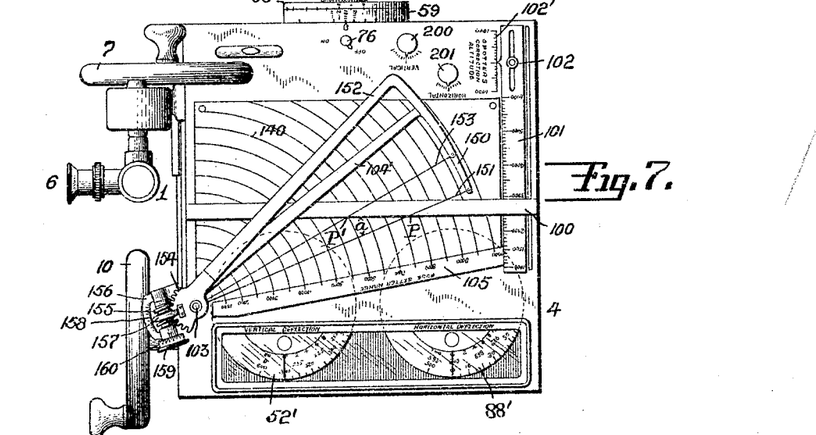
Fig. 7 is a plan view of a slightly modified form of telemeter.
Figure 14:
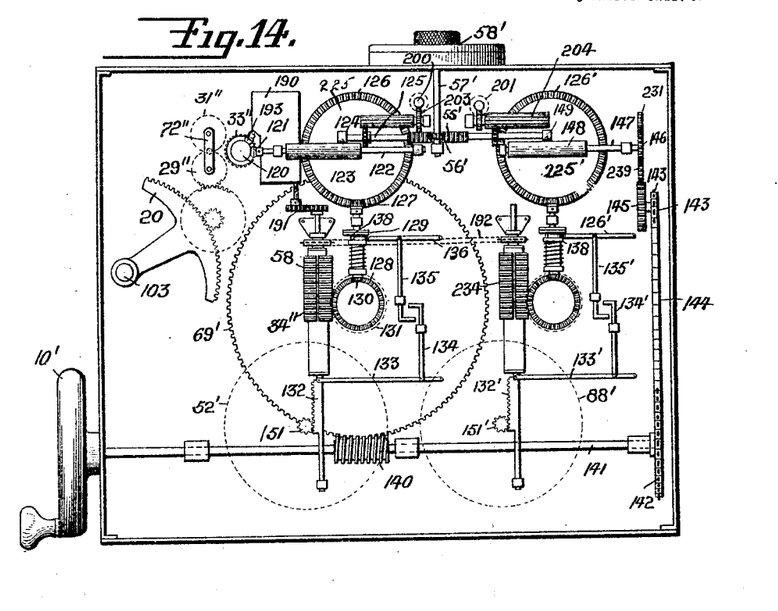
Fig. 14 is a plan view of the interior of a telemeter box of the modified form of telemeter shown in Fig. 7.
Figure 14A:
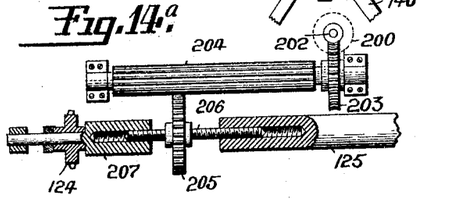
Figure 15:
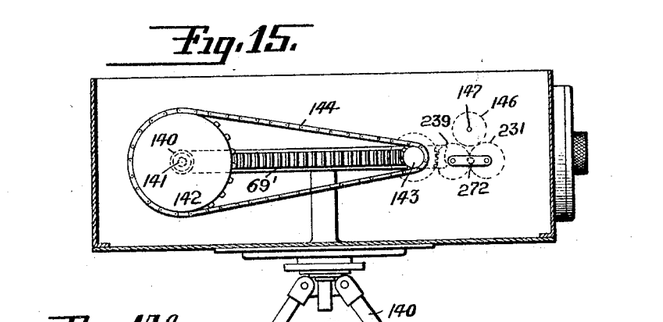
Fig. 15 is an end view of the interior of the said box.

It is of course immaterial as far as the broad aspect of our invention is concerned whether the angular movements of the sight be combined with the time indication before or after the rate of motion indicator is introduced. Thus in Figs. 14 and 15 is illustrated a method by which the said angular movements are combined directly with the time and the rate of the resultant motion measured by a rate of motion indicator. In this figure the shaft 103 and sector 20 will at once be recognized from the description of Fig. 1, as will also the reversing gear member 72''. Gears 29'' and 31'' are adapted to be brought into mesh with a gear 33'' having bevel gear face 120. A smaller bevel gear 121 meshes therewith and is mounted on a shaft 122 on which is a friction roller 123. A second roller 124 engages roller 123 and also engages the friction face 225 of bevel gear 126. Said roller 124 is adjusted toward and away from the center of gear 126 by being adjustably secured to rack bar 125 as hereinafter explained. The teeth 55' of said bar engage the pinion 56' on a shaft 57'. Said shaft is adjusted by a time indicator 58' which may be similar in all respects to indicator 58 of Fig. 1. It will be seen therefore that the rate of rotation of gear 126 is dependent both upon the rate of movement of the sight about its horizontal axis and the setting of the time at 58'. The rate of motion of the gear 126 may then be measured by the rate of motion indicator 34'' which may be similar in all respects to indicator 34. In order to effect this purpose the bevel pinion 127 is driven by gear 126 and serves to drive the bevel gear 128 through friction clutch 129, and bevel pinion 130. Gear 128 is shown as also provided with spur teeth 131 which engage the gear sectors 58 of device 34''. The movement of said device is shown as transmitted to the dial 52' by means of rack bar 132 and pinion 151 on the dial. As the rack bar approaches the limit of its motion it disengages the friction clutch 129 through lever 133, links 134 and 135 and the lever 136 as will be readily apparent, the latter lever engaging the slidably mounted spring pressed collar 138 on the shaft of gear 130. Similarly the motion of the sighting instrument about the horizontal axis may be combined with the time as follows:

The hand wheel 10' is shown as rotating the entire casing by means of the worm 140 mounted on the shaft 141 of the hand wheel which engages the large stationary gear 69'. Also mounted on said shaft 141 is a sprocket wheel 142 which drives a sprocket pinion 143 through chain 144. A gear 145 is mounted to drive gear 239 and 231 on the swiveling bracket 272 similar to bracket 72''. Either one or the other of said gears 231, 239 is brought into mesh with the gear 146 as before. Gear 146 is mounted on the shaft 147 of friction roller 148. The cooperating friction roller 149 therefor is preferably mounted on the aforementioned rack bar 125 and engages the said roller 148 and also the friction face 225' of bevel gear 126' whereby the movement of the sighting device about the vertical axis is combined with the time. The rate of motion of said movement is then ascertained by means of the rate of motion of indicator 234 by means which may be similar in all respects to means described with reference to indicator 34'', as shown, and the deflection indicated on dial 88'. Speed indicators 34'' and 234 are shown as driven from a clock work 190 through gears 191 and chain 192. In this instance, an automatic rewind for the clock may be provided by driving from bevel gear 120 or some other gear rotated by turning of the sight, the pinion 193. The shaft of said pinion extends within the housing of clock 190 and serves to rewind it by any of the well known mechanisms for such purpose. The preferred form of face for this type of instrument which also may be used on other types, is illustrated in Fig. 7. According to this figure the bar 104' is secured to shaft 103 and is provided with an arm 150 and a wire or thread 151 stretched between the end of the arm 150 and the base of the bar 104—the wire being employed instead of the edge of the bar 104 to read in connection with curves 140 and bar 100. A second arm 152 secured to said first arm 104' but adjustable with respect thereto is preferably also employed for the purpose of obtaining the fuse setters range. This arm is also shown as provided with a reading wire 153. Said arm is loosely mounted on the shaft 103 and provided with teeth 154 which mesh with a worm 155 journaled in an extension 156 of bar 104'. Said arm 152 may be provided with a pointer 157 to read on scale 158, on said extension, while the worm shaft is provided with knob 159 and micrometer scale 160 showing the adjustment thereof. The wire 153 is adapted to be set at the vertical angle of deflection indicated by dial 52' with respect to the wire 151, so that the wire 153 indicates the true angle subtended by the target at the time the shell reaches the target. It is evident therefore that if the intersection wire 153 of bar 100 be read upon scale 105 that the fuse setters range may be obtained, as in the other form of the invention.

In addition to the spotter's correction for altitude, we may also provide a similar correction for the horizontal and vertical deflection. These corrections may be applied through knobs 200 and 201 on the face of the instrument and secured on worm shafts 202, and driving worm wheels 203 (Fig. 14ª). On the shaft of each of said wheels is a long pinion 204, meshing with a gear 205 on oppositely or differentially threaded shaft 206. Said shaft is threaded at one end in bar 125 and at the end in member 207 supporting the roller or ball 124. It will be apparent that by this or other means, the position of ball 124 may be varied and the angular deflection changed without disturbing the setting of dials 58.

One method of using our invention is as follows:

Three men may be employed to operate the apparatus. Operator 1 may keep the sight on the target by turning the handles 7 and 10. Operator 2 may set the altitude as indicated by bar 100 on scale 101 according to the altitude as given him by the goniometer. He may then set the dial 59 according to the indicated range on scale 105 as indicated by point P, knob 62 being then turned so as to add the "dead" time to the time of flight. This operator may also continuously read off the fuse setter's range as indicated by point P' on scale 105. Operator 3 may reset arm 104 by turning knob 180 as explained in the form of the invention shown in Fig. 6 or he may adjust arm 152 in the form of the invention shown in Fig. 7, to obtain the fuse setter's range, according to the vertical deflection indicated by dial 52 or 52'. Operator 3 may also call off the vertical and horizontal deflection readings as shown by the dials 52 and 88 to the gunners. An observer may also introduce the spotter's corrections, correcting for either wind or other disturbing factors. This may be effected first by shifting the altitude scale 101 up or down on scale 102. This not only increases or decreases the range but has the effect of automatically increasing or decreasing the speed of the target. If the range appears to be accurate and the shots are off to one side of the target the spotter may introduce the corrections by turning either knob 200 or knob 201 or both, which works through multiplying gearing 205, to decrease or increase the horizontal or vertical deflection, as explained. The adjustment of the vertical deflection in this case will also properly vary the range.

The method of using the instrument may of course be varied. Thus, instead of initially adding the "dead" time and the time of flight by means of dials 59 and 60, whereby point P indicates the range of the target at the time the signal is transmitted to the gun and dial 52 the vertical deflection during said combined times, the "dead" time may be entirely neglected, as far as deflection is concerned, the sight and gun being kept continually on the target. Thus suppose dial 59 is set to the time of flight and the "dead" time disk either omitted or set at 0, dial 52 would then show the true vertical deflection or the deflection of the target between the firing of the shell and its striking the target, instead of showing as before, a total deflection, which includes the deflection of the target during the time taken for loading. If the latter system is adopted, it would still be necessary to make use of the "dead" time to obtain the fuse setter's range. This may be done as follows: First set the "dead" time (only) by knob 62 using either dial 59 or 60. Then from the reading thus obtained, set arm 152 with respect to arm 104' (Fig. 7). Then set the time of flight only by knob 62 which shows the true deflection. Finally advance the position of 152 with respect to arm 104' an amount equal to the true vertical deflection from its previous position which will give point P' and the fuse setter's range.

In accordance with the provisions of the patent statutes, we have herein described the principle of operation of our invention, together with the apparatus, which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention what we desire to secure by Letters Patent is:

1. A telemetric device for high altitude ordnance comprising a sight adjustable about both a horizontal and a vertical axis, means for rotating said sight about said axes, a range instrumentality, means positionable in accordance with the angular velocity of the sight about each axis, means settable in accordance with a time function of the range of a target, and means controlled by said two first named means for indicating the product of the angular velocity of the sight about each axis and said function of the range.

2. A telemetric device for high altitude ordnance comprising a sight adjustable about both a horizontal and a vertical axis, means for rotating said sight about said axes, means positionable in accordance with the angular velocity of the sight about each axis, means settable in accordance with a time function of the range of a target, and means controlled by said two first named means for indicating simultaneously the product of the angular velocity of the sight about each axis and said function of the range.

3. A telemetric device for high altitude ordnance comprising a sight adjustable about both a horizontal and a vertical axis, means including an element positionable by said sight in accordance with the angle of the sight in a vertical plane and an element settable in accordance with the altitude of a target for indicating the range of said target, means settable in accordance with a time function of the indicated range, means for measuring the rate of motion of said sight in said plane, and means connected with said second and last named means for indicating the product of the angular velocity of the sight about each axis and said function of said range.

4. A telemetric device for high altitude ordnance comprising a sight adjustable about a plurality of axes, means for rotating said sight about said axes, means for measuring the angular velocity of the sight about one of said axes, means for measuring the angular velocity of said sight about the other of said axes, a time indicator, and means controlled by said time indicator and each of said velocity measuring means for indicating the product of the time and the angular velocity of said sight about each of said axes.

5. In a telemetric device for high altitude ordnance, a sight adjustable about a plurality of axes, means for rotating said sight about said axes, means for measuring the angular velocity of the sight about one of said axes, means for measuring said angular velocity about the other of said axes, an indicator of the time of flight of the shell, a second time indicator, and means controlled by said indicators and velocity measuring means for indicating the deflection of the sight about said axes.

6. In a telemetric device, a sight rotatable about an axis, and means comprising an element settable in accordance with the angle of the sight about said axis and an element settable in accordance with the altitude of a target for indicating the range of said target.

7. In a telemetric device, a sight rotatable about an axis, means comprising an element positionable in accordance with the angle of sight about said axis and an element settable in accordance with the altitude of a target for indicating the range of said target, means for measuring the angular velocity of said sight, a member settable in accordance with a time function of the indicated range, and indicating means connected with said velocity measuring means and said member.

8. A telemetric device comprising a sight adjustable about an axis, means for rotating said sight about said axis, a movable element, means for positioning said element in accordance with the rate of angular motion of the sight about said axis, a second movable element, means for positioning said second element in accordance with a time function of the range of a target, and indicating means controlled by said movable elements.

9. A telemetric device comprising a sight adjustable about an axis, means for indicating the range of a target, means positionable in accordance with the rate of motion of said sight about said axis, means positionable in accordance with said indicated range, and means controlled by said two last mentioned means for indicating the deflection of the sight.

10. A telemetric device for ordnance comprising a sight adjustable about both a horizontal and a vertical axis, means connected with said sight for movement in accordance with the velocity thereof about each axis, means movable with respect to said first named means in accordance with a time function of the range of a target, and means controlled by said two first named means for indicating the product of the angular velocity of said sight about each axis and said function of the range.

11. In a telemetric device, a sight rotatable about a horizontal axis, a member rotated by said sight to indicate the angle of elevation thereof, a second member movable with but adjustable with respect to the first mentioned member, means for indicating the angle of deflection of the sight in a vertical plane, and means for setting said second member at an angle to said first member equal to said angle of deflection.

12. In a telemetric device for ordnance, a sight, means for moving said sight about an axis, a movable element, means connecting said element with said sight for causing said element to move in accordance with the velocity of said sight about said axis, a second movable element, means for positioning said second element in accordance with the range of a target, and means controlled by said elements for indicating the product of the angular velocity of the sight about said axis and a time function of the range.

13. In a telemetric device, a sight rotatable about a horizontal axis, an arm connected to rotate therewith about an axis, a slide adapted to be set according to the altitude of the target, a range scale to indicate the range at the point of intersection of said arm and said slide, a second arm connected to rotate with said first arm but settable with reference thereto, and means whereby the same may be set at the angle of vertical deflection with respect to the first arm, whereby the fuse setter's range is shown on the range scale.

14. In a telemetric device, a sighting device mounted for rotation, a speed indicator and reversing gear between said device and indicator whereby said indicator may be driven in the same direction irrespective of the direction of rotation of said device and a second indicator for showing the direction of rotation of said device.

15. In a telemetric device, a sighting device mounted for rotation, a speed indicator, and reversing gear between said device and indicator whereby said indicator may be driven in the same direction irrespective of the direction of rotation of said device and manually operable means for disconnecting said device and indicator.

16. In a measuring instrument, a sighting device, means for mounting the same for rotation about a plurality of axes, and a separate speed indicator connected with said device about each of said axes of rotation, whereby the apparent velocity is simultaneously measured in a plane normal to each of said axes.

17. In a measuring instrument, a sighting device, means for mounting the same for rotation about a plurality of axes, speed indicators connected to said device for actuation by the movements of said device about said axes of rotation and means for disconnecting said device and indicators.

18. In a measuring instrument, a sighting device, means for mounting the same for rotation about a plurality of axes, speed indicators connected to said device for actuation by the movements of said device about said axes of rotation and a common means for disconnecting each of said indicators from said device.

19. A telemetric device for high altitude ordnance comprising a sight adjustable about both a horizontal and a vertical axis, a rotatable member receiving motion by adjustment of the sight about one axis, a second member receiving motion by adjustment of the sight about the other axis, a plurality of rate of motion indicators, a range indicator, and interconnecting means between each of said members and said indicators for determining the deflection about said axes of the sight.

20. In a telemetric device for high altitude ordnance, a sight adjustable about a plurality of axes, means whereby the sight may be rotated about said axes, a rotatable member receiving motion by adjustment of the sight about each axis, a rate of motion indicator arranged for actuation by the movements of the sight about each axis, a time indicator and connecting means between each of said members, said motion indicators and said time indicator for determining the deflection of the sight.

21. In a telemetric device, a sight rotatable about a horizontal axis, a member following the rotation of said sight to indicate the angle of elevation of the sight and a second member movable with but adjustable with respect to the first member and adapted to maintain the deflection angle with the first member.

22. In a telemetric device, a sight rotatable about a horizontal axis, a member following the rotation of said sight to indicate the angle of elevation of the sight, a second member movable with but adjustable with respect to the first member and adapted to maintain the deflection angle with the first member, and a scale cooperating with said second member for showing the fuse setter's range.

23. In a telemetric device, a sight rotatable about a horizontal axis, a member rotated by said sight to indicate the angle of elevation thereof, a second member movable with but adjustable with respect to the first mentioned member, means for indicating the angle of deflection of the sight in a vertical plane, means for setting said second member at an angle to said first member equal to said angle of deflection, and means readable in conjunction with said second member for showing the fuse setter's range.

In testimony whereof we have affixed our signatures.

ELMER A. SPERRY.
ELMER A. SPERRY, Jr.